(12) United States Patent
Kurabayashi et al.

(10) Patent No.: US 9,087,351 B2
(45) Date of Patent: Jul. 21, 2015

(54) FLAT RATE PRICING WITH PACKET-FREQUENCY-AWARE BILLING SYSTEM FOR MOBILE BROADBAND COMMUNICATION

(75) Inventors: Shuichi Kurabayashi, Fujisawa (JP); Naofumi Yoshida, Yokohama (JP); Kosuke Takano, Fujisawa (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 13/127,301

(22) PCT Filed: Oct. 4, 2010

(86) PCT No.: PCT/JP2010/067337
§ 371 (c)(1),
(2), (4) Date: May 3, 2011

(87) PCT Pub. No.: WO2012/046286
PCT Pub. Date: Apr. 12, 2012

(65) Prior Publication Data
US 2012/0084232 A1    Apr. 5, 2012

(51) Int. Cl.
*G07F 19/00* (2006.01)
*H04M 15/00* (2006.01)
*G06Q 30/02* (2012.01)
*H04L 12/14* (2006.01)
*H04W 4/24* (2009.01)
(Continued)

(52) U.S. Cl.
CPC ........ *G06Q 30/0283* (2013.01); *H04L 12/1435* (2013.01); *H04M 15/00* (2013.01); *H04M 15/80* (2013.01); *H04M 15/8005* (2013.01); *H04W 4/24* (2013.01)

(58) Field of Classification Search
CPC .............................. G06Q 30/04; G06Q 20/145
USPC ........................................................... 705/34
See application file for complete search history.

(56) References Cited

U.S. PATENT DOCUMENTS

2003/0093341 A1* 5/2003 Millard et al. .................. 705/34
2003/0103450 A1   6/2003 Chapman et al.
(Continued)

FOREIGN PATENT DOCUMENTS

CN    101777066 A    7/2010
EP    1 850 575 A1   10/2007
(Continued)

OTHER PUBLICATIONS

Spb GPRS Monitor User Manual, Spb Software House, Dec. 17, 2006.*
(Continued)

*Primary Examiner* — George Chen
(74) *Attorney, Agent, or Firm* — Maschoff Brennan

(57) ABSTRACT

An information processing apparatus stores a first threshold of a common carrier, the common carrier charging according to the first threshold to be applied to a packet communication volume in each first unit period; performs a packet communication to and from a communication apparatus of the common carrier; calculates a packet communication volume in each second unit period shorter than the first unit period; and controls the packet communication based on the packet communication volume in the second unit period so as to keep the packet communication volume in the first unit period below the first threshold.

19 Claims, 14 Drawing Sheets

(51) Int. Cl.
  *G06Q 10/00* (2012.01)
  *G06Q 30/00* (2012.01)
  *G06F 17/00* (2006.01)
  *G06G 7/00* (2006.01)

(56) References Cited

U.S. PATENT DOCUMENTS

| | | | |
|---|---|---|---|
| 2003/0135639 A1* | 7/2003 | Marejka et al. | 709/232 |
| 2004/0057420 A1 | 3/2004 | Curcio et al. | |
| 2004/0146006 A1 | 7/2004 | Jackson | |
| 2004/0199635 A1 | 10/2004 | Ta et al. | |
| 2006/0187821 A1 | 8/2006 | Watanabe et al. | |
| 2009/0282127 A1* | 11/2009 | Leblanc et al. | 709/219 |
| 2010/0002723 A1 | 1/2010 | Kerr et al. | |
| 2010/0188994 A1* | 7/2010 | Raleigh | 370/252 |

FOREIGN PATENT DOCUMENTS

| | | |
|---|---|---|
| JP | 03-148939 | 6/1991 |
| JP | 04-319835 | 11/1992 |
| JP | 2008-130594 A | 5/1996 |
| JP | 10-190730 | 7/1998 |
| JP | 10-262067 | 9/1998 |
| JP | 2001-339434 | 12/2001 |
| JP | 2003-008572 A | 1/2003 |
| JP | 2004-289431 | 10/2004 |
| JP | 2005-198021 A | 7/2005 |
| JP | 2006-129024 | 5/2006 |
| JP | 2006-186916 | 7/2006 |
| JP | 2009-021783 | 1/2009 |
| JP | 2009-171431 | 7/2009 |
| JP | 2010-154576 | 7/2010 |
| WO | 02/091726 A1 | 11/2002 |
| WO | 2007/052484 A1 | 10/2006 |

OTHER PUBLICATIONS

Segan, Analysis: iPhone Rate Plan is Actually Pretty Good, PCMAG.com, 2007, pp. 1-3.
Tschofenig, Dealing with P2P Traffic in an Operator Network: State-of-the-Art.
Feeling squeezed by flat-rate plans? Move to tiered services.
Packet Flat-rate Full, SoftBack Mobile Corp.
Rate Table (From Overseas), Designing The Future KDDI.
"Spb GPRS Monitor User Manual," Spb Software House. Dec. 17, 2006.
International Search Report for International Application No. PCT/JP2010/067337, European Patent Office, mailed on Dec. 15, 2010.

* cited by examiner (A)

(B)

(C)

(A)

(B)

FLAT RATE PRICING WITH PACKET-FREQUENCY-AWARE BILLING SYSTEM FOR MOBILE BROADBAND COMMUNICATION

BACKGROUND

In recent years, mobile phones are widely used for not only voice call but also packet communication. With the spread of packet communication in mobile phones, a flat rate model for fixing the packet communication fee has been introduced. For example, Non Patent Literature 1 discloses a pricing model for fixing the packet communication fee regardless of the packet communication volume. The adoption of the flat rate model allows the user to use packet communication without considering the fees, thus promoting the use of network services.

The flat rate model allows all the users to equally use a bandwidth, but may allow a small number of users to occupy the bandwidth by transmitting and receiving a large amount of data. In light of this, communication service carriers for mobile phones apply bandwidth limiting measures to the users performing a large amount of packet communication to prevent bandwidth oligopoly by a part of users.

SUMMARY

However, such bandwidth limiting measures are uniformly applied to users performing a large amount of packet communication in a short period of time, thereby preventing a new network service using a large volume of data from emerging. Meanwhile, broadband technology for mobile packet communication such as an HSPA (High Speed Packet Access) which is a high-speed packet communication standard and an eHSPA (Evolved HSPA) increases a temporarily usable bandwidth. Therefore, it is very important to create a new business opportunity for enabling the use of increased bandwidth without applying uniform bandwidth limiting measures.

Thus, it is desirable that the pricing model has both of a function of promoting the use of network services like the flat rate and a function of naturally preventing bandwidth oligopoly like the measured rate.

The information processing apparatus of the present disclosure may include: a threshold storage unit capable of storing a first threshold of a common carrier, the common carrier charging according to the first threshold to be applied to a packet communication volume in each first unit period; a packet communication unit capable of performing packet communication to and from a communication apparatus of the common carrier; a packet communication volume calculation unit capable of calculating a packet communication volume in each second unit period shorter than the first unit period; and a packet communication control unit capable of controlling the packet communication unit based on the packet communication volume in the second unit period so as to keep the packet communication volume in the first unit period below the first threshold.

Further, according to the information processing apparatus of the present disclosure, the packet communication control unit may control whether the packet communication conducted by the packet communication unit is enabled or not based on the packet communication volume in the second unit period so as to keep the packet communication volume in the first unit period below the first threshold.

Further, according to the information processing apparatus of the present disclosure, when the packet communication volume in the second unit period exceeds the second threshold obtained by dividing the first threshold in the first unit period for each second unit period, the packet communication control unit may stop the packet communication conducted by the packet communication unit until an average packet communication volume in the second unit period is equal to or less than the second threshold.

Further, according to the information processing apparatus of the present disclosure, the packet communication control unit may change a size of data transmitted or received by the packet communication unit so as to keep the packet communication volume in the first unit period below the first threshold.

In addition, the information processing apparatus of the present disclosure may further include an information output unit capable of outputting information indicating that the size of data is changed.

Further, according to the information processing apparatus of the present disclosure, the packet communication volume calculation unit may calculate the packet communication volume in the second unit period using a weight determined according to an attribute of a packet.

Further, according to the information processing apparatus of the present disclosure, the attribute of a packet may include a communication destination with which the packet communication unit communicates through a communication apparatus of the common carrier.

Further, according to the information processing apparatus of the present disclosure, the threshold storage unit may store the communication time period and the first threshold associated with each other; and the packet communication control unit may control the packet communication unit based on the packet communication volume in the second unit period so as to keep the packet communication volume in the first unit period below the first threshold corresponding to the communication time period including the current time.

In addition, the information processing apparatus of the present disclosure may further include an information output unit capable of outputting information indicating a relation between the communication time period and the first threshold based on the communication time period and the first threshold stored in the threshold storage unit.

In addition, the information processing apparatus of the present disclosure may further include an information output unit capable of outputting information indicating a packet communication volume in each second unit period calculated by the packet communication volume calculation unit.

In addition, the information processing apparatus of the present disclosure may include: a threshold storage unit capable of storing a threshold to be applied to a packet communication volume in each calculation unit period shorter than a charge unit period for packet communication of a user terminal; a packet communication volume calculation unit capable of calculating a packet communication volume of a user terminal in each calculation unit period; and a charge determination unit capable of determining a charge in a charge unit period based on a relation between the packet communication volume and the threshold in each calculated calculation unit period.

Further, according to the information processing apparatus of the present disclosure, when the packet communication volume in each calculation unit period exceeds a predetermined number of times, the charge determination unit may determine the charge in the charge unit period as the charge according to the threshold.

Further, according to the information processing apparatus of the present disclosure, the threshold storage unit may store the communication time period and a threshold associated with each other; and the charge determination unit may determine a charge in the charge unit period based on a relation between the packet communication volume in the calculation unit time and the threshold corresponding to the communication time period including the calculation unit time for each calculation unit time.

Note that in the present description, the word "unit" includes a unit implemented by hardware, a unit implemented by software, and a unit implemented by a combination of both. Note also that one unit may be implemented by two or more pieces of hardware, and two or more units may be implemented by one piece of hardware.

DETAILED DESCRIPTION

Figure 1:
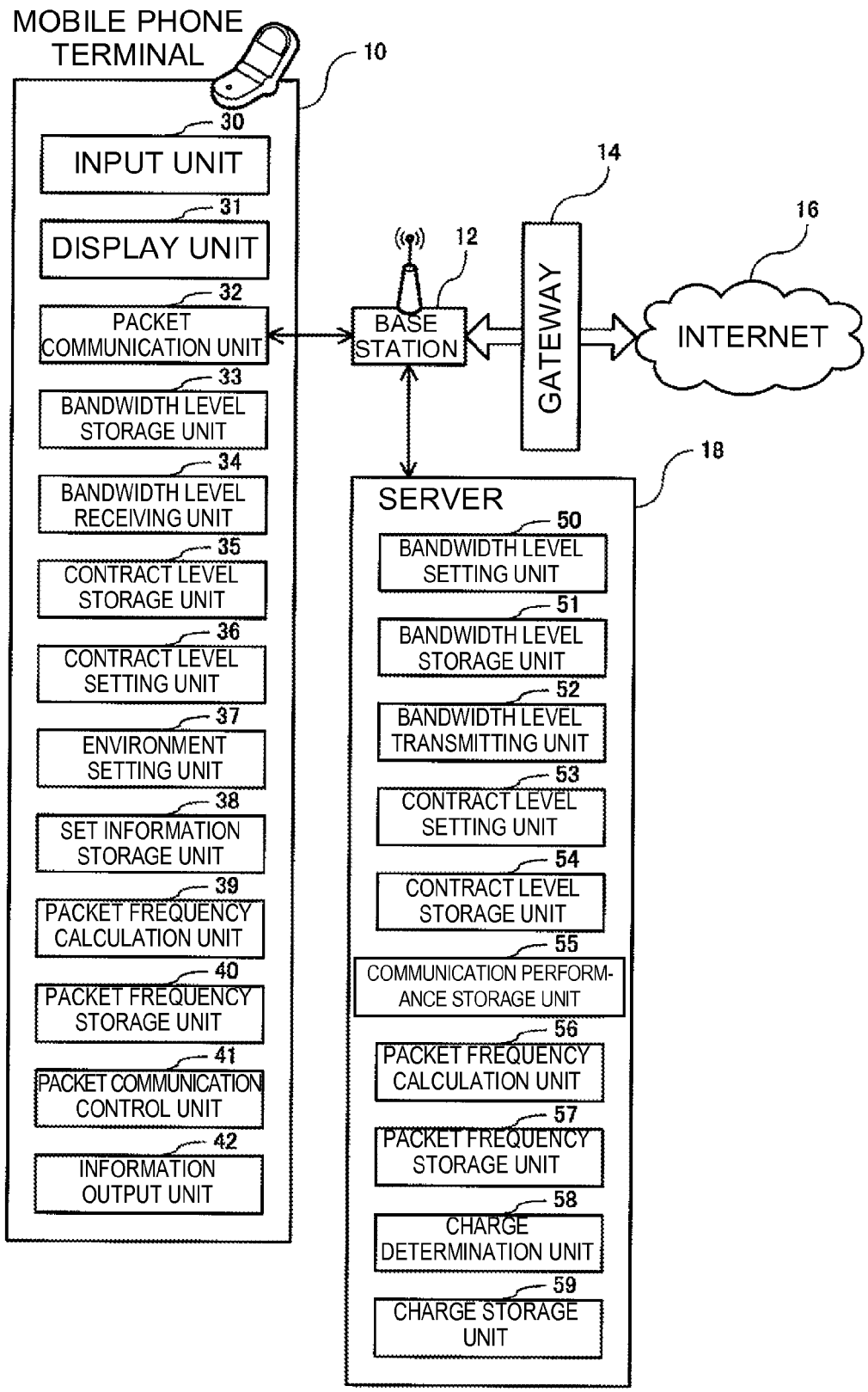
FIG. 1 illustrates a configuration of a mobile phone system according to the present disclosure.

FIG. 1 illustrates a configuration of a mobile phone system according to the present disclosure. The mobile phone system includes a mobile phone terminal 10, a base station 12, a gateway 14, the Internet 16, and a server 18. The mobile phone system provides not only a voice call service but also a packet communication service.

The mobile phone terminal 10 is an information processing apparatus used by a user and is capable of using a voice call service and a packet communication service. As illustrated in FIG. 1, the mobile phone terminal 10 includes an input unit 30, a display unit 31, a packet communication unit 32, a bandwidth level storage unit 33, a bandwidth level receiving unit 34, a contract level storage unit 35, a contract level setting unit 36, an environment setting unit 37, a set information storage unit 38, a packet frequency calculation unit 39, a packet frequency storage unit 40, a packet communication control unit 41, and an information output unit 42.

The input unit 30 is used for the user to input operation information to the mobile phone terminal 10, such as an input key and a touch panel.

The display unit 31 is used to display various information to the user, such as a display and an indicator.

The packet communication unit 32 is used for a packet communication through the base station 12. Note that the packet communication through the base station 12 includes a packet communication with other mobile phone terminals of the same common carrier and a packet communication with various external systems through the Internet 16.

The bandwidth level storage unit 33 (threshold storage unit) stores information about a bandwidth level indicating a packet communication pricing model in the present mobile phone system. Note that the information about a bandwidth level indicates a relation between a communication time period and a packet frequency upper limit (threshold). Note also that the packet frequency refers to a packet communication volume in each unit period (e.g., one hour) shorter than one day, and can be obtained by the following expression.

[Expression 1]

$$pf = \frac{\sum_{i=0}^{n}(d_i \cdot w_i)}{t} \quad (1)$$

In the expression (1), pf denotes a packet frequency; $d_i$ denotes a size of an i-th packet; $w_i$ denotes a priority weight that is a weight for the i-th packet; t denotes a unit period; and n denotes the number of packets communicated within the unit period.

The bandwidth level storage unit 33 can store information about the bandwidth level for each day. In other words, the relation between the communication time period and the packet frequency upper limit in each bandwidth level may vary from day to day.

Figure 2:
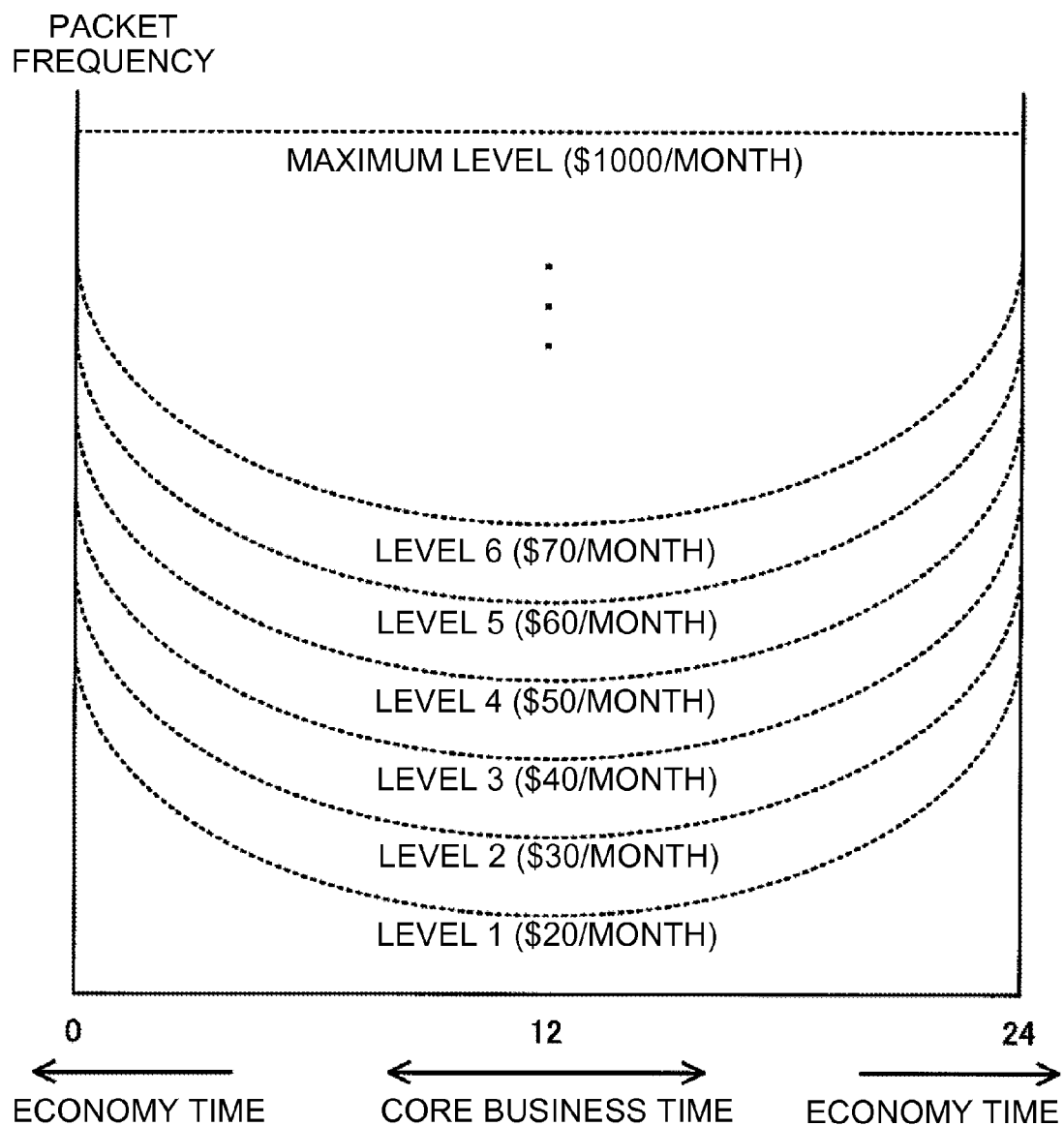
FIG. 2 illustrates an example of a bandwidth level.

FIG. 2 illustrates an example of the bandwidth level. In FIG. 2, the horizontal axis indicates a time period of packet communication, and the vertical axis indicates a packet frequency. A plurality of bandwidth levels indicating the packet communication fee according to the relation between the time period and the packet frequency are illustrated. More specifically, in the example of FIG. 2, the relation between the communication time period and the packet frequency upper limit is illustrated for each bandwidth level from level 1 to the maximum level. For example, in the example of FIG. 2, when the bandwidth level is "level 4", the monthly packet communication fee is 50 dollars. In addition, the packet frequency upper limit in "level 4" is set to be higher at night (economy time) than in the day (core business time). Further, the packet frequency upper limit at night in "level 4" is approximately the same as the packet frequency upper limit in the day in "level 6".

Note that the priority weight considered in calculation of the packet frequency is determined according to the attribute of the packet such as the data size of the content and the communication destination. Examples of the communication destination in the packet communication include the following three destinations. The first is a general communication destination such as a communication destination used by the user to access a Web, transmit and receive a general mail message, download a moving image, and perform a video chat. The second is an important communication destination such as a communication destination used to receive an emergency earthquake information mail message, communicate with a current position information notice service for confirming the current position of a child or an aged person, and receive a mail message having a high emergency issued by an administrative body. The third is a common carrier-related communication destination such as a communication destination used for packet communication using a pay service provided by the common carrier.

Setting the priority weight according to the communication destination can control the effect of the packet communication on the packet frequency. For example, setting the priority weight to 1 for the general communication destination allows the packet communication volume of a voluntary packet communication by the user to be added to the packet frequency as is. Further, setting the priority weight to 0 for the important communication destination allows the packet communication with the important communication destination to be ignored in calculation of the packet frequency. In other words, the user can perform packet communication with the important communication destination without considering the effect on the packet frequency. Furthermore, the common carrier is also considered to be responsible for the packet communication with the common carrier-related communication destination. Therefore, for example, the priority weight is set to 0.5 for the common carrier-related communication destination, and thereby the effect of the packet communication with the common carrier-related communication destination on the packet frequency can be approximately half of that of the packet communication with the general communication destination thereon.

Now, by referring back to FIG. 1, the bandwidth level receiving unit 34 receives information about a bandwidth level transmitted from the server 18 through the base station 12 and stores the information in the bandwidth level storage unit 33. In other words, the common carrier can update the information about the bandwidth level stored in the mobile phone terminal 10.

The contract level storage unit 35 stores information about a contract level that is a bandwidth level contracted between the user of the mobile phone terminal 10 and the common carrier. Note that examples of the pricing model provided by the common carrier include the following three models. Type 1 is a pricing model of charging a packet communication fee of the bandwidth level according to the packet frequency performance without imposing an upper limit on the packet frequency usable by the user. Type 2 is a pricing model of charging a fixed packet communication fee according to the contract level regardless of the packet frequency performance by controlling the packet communication so as not to allow the packet frequency to be equal to or greater than the contract level. Type 3 is a pricing model of charging a packet communication fee of the bandwidth level according to the packet frequency performance by controlling the packet communication so as not to allow the packet frequency to be equal to or greater than the contract level. Thus, the contract level storage unit 35 stores not only the information about the contract type but also the information about the contract level when the contract type is type 2 or type 3. The information to be stored in the contract level storage unit 35 may be set by the common carrier side based on the contract content of the user when the user buys the mobile phone terminal 10 or may be changed by the user operating the mobile phone terminal 10.

The contract level setting unit 36 can change the setting of the contract type and the contract level according to the operation by the user. Note that the contract change content by the operation of the user is transmitted to the common carrier side and is stored in the contract level storage unit 35.

Figure 3:
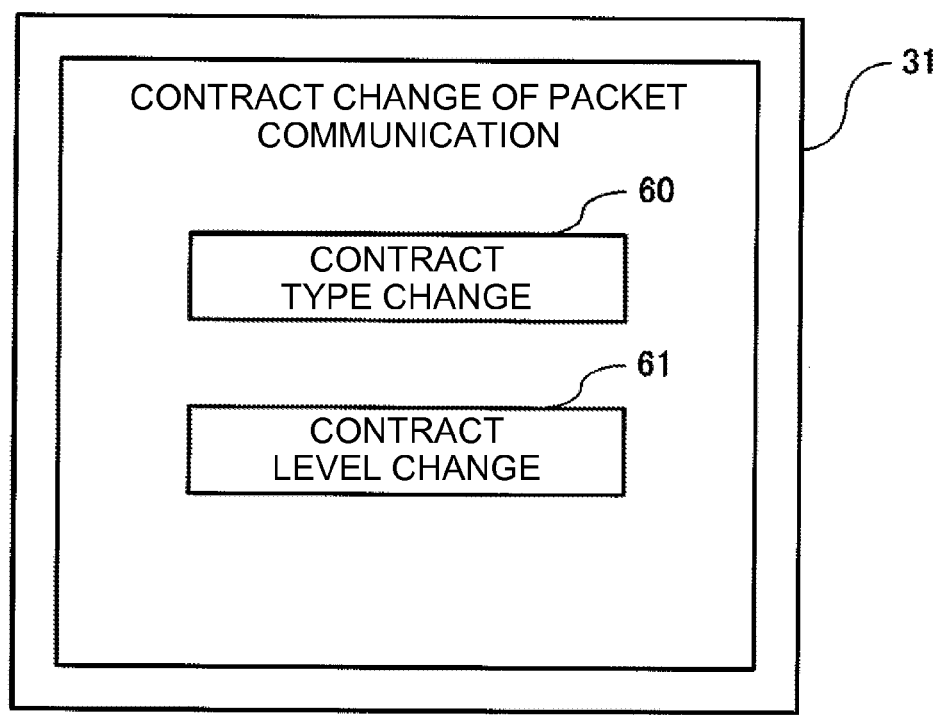
FIG. 3 illustrates an example of a user interface for contract change.
Figure 4:
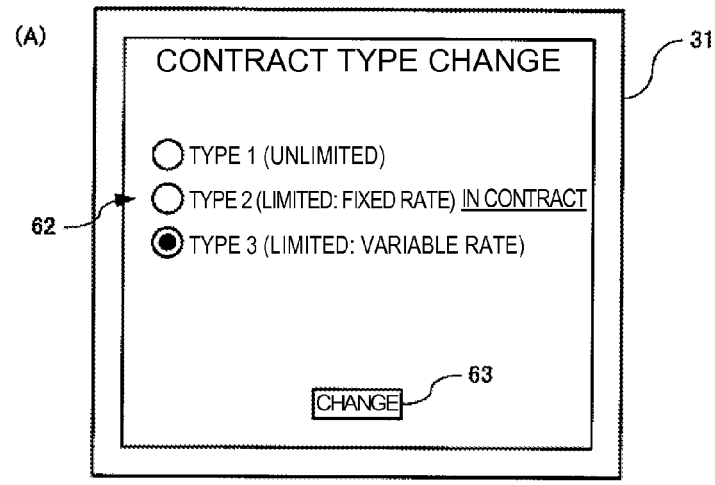
FIG. 4 illustrates an example of a user interface for contract change.
Figure 4:
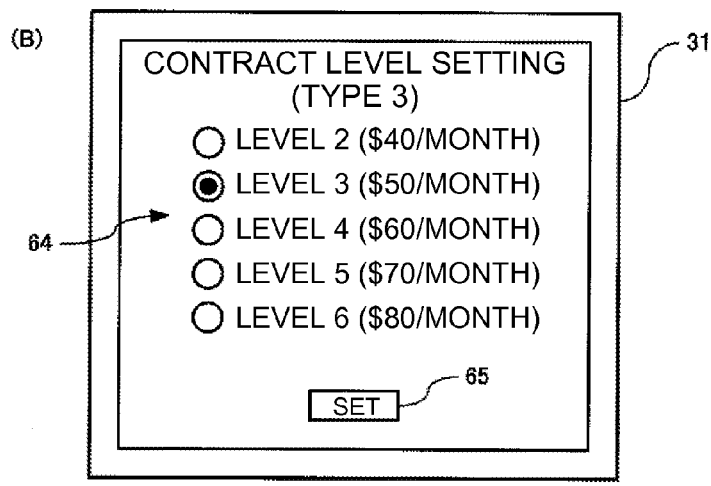
Figure 4:
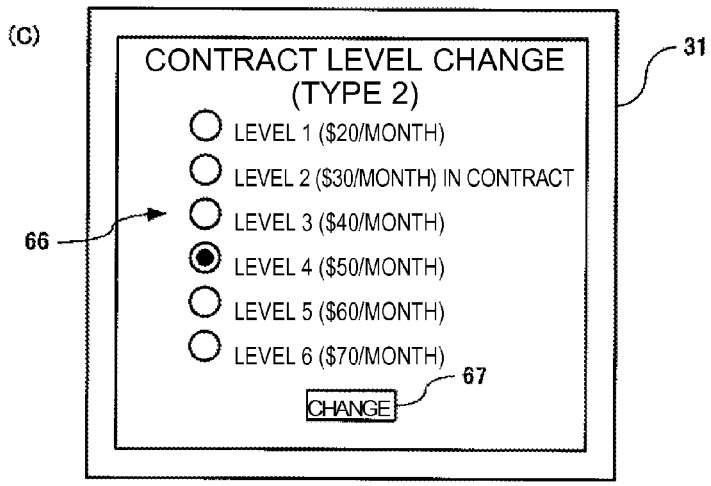

FIGS. 3 and 4 illustrate an example of a user interface for contract change provided by the contract level setting unit 36. For example, when the user selects the contract change of packet communication from the main menu, a screen illustrated in FIG. 3 is displayed. This screen includes a button 60 for changing the contract type and a button 61 for changing the contract level. When the contract type change button 60 is pressed, a screen illustrated in FIG. 4(A) is displayed. This screen includes radio buttons 62 for selecting the contract type and a change button 63 for instructing the contract type to be changed to the selected contract type. FIG. 4(A) displays the state in which the currently contracted contract type is type 2 and the user selects type 3. When the change button 63 is pressed in this state, as illustrated in FIG. 4(B), a screen for setting the contract level in type 3 is displayed. The screen illustrated in FIG. 4(B) includes radio buttons 64 for selecting the contract level and a set button 65 for instructing the selected contract level to be set. When the contract level change button 61 is pressed on the screen illustrated in FIG. 3, as illustrated in FIG. 4(C), a screen for changing the contract level in the currently contracted contract type is displayed. This screen includes radio buttons 66 for selecting the contract level and a change button 67 for instructing the contract level to be changed to the selected contract level. In response to the user operation through the user interface, the contract level setting unit 36 updates the information about the contract type and the contract level stored in the contract level storage unit 35 and transmits the updated information to the server 18 of the common carrier through the base station 12.

Figure 5:
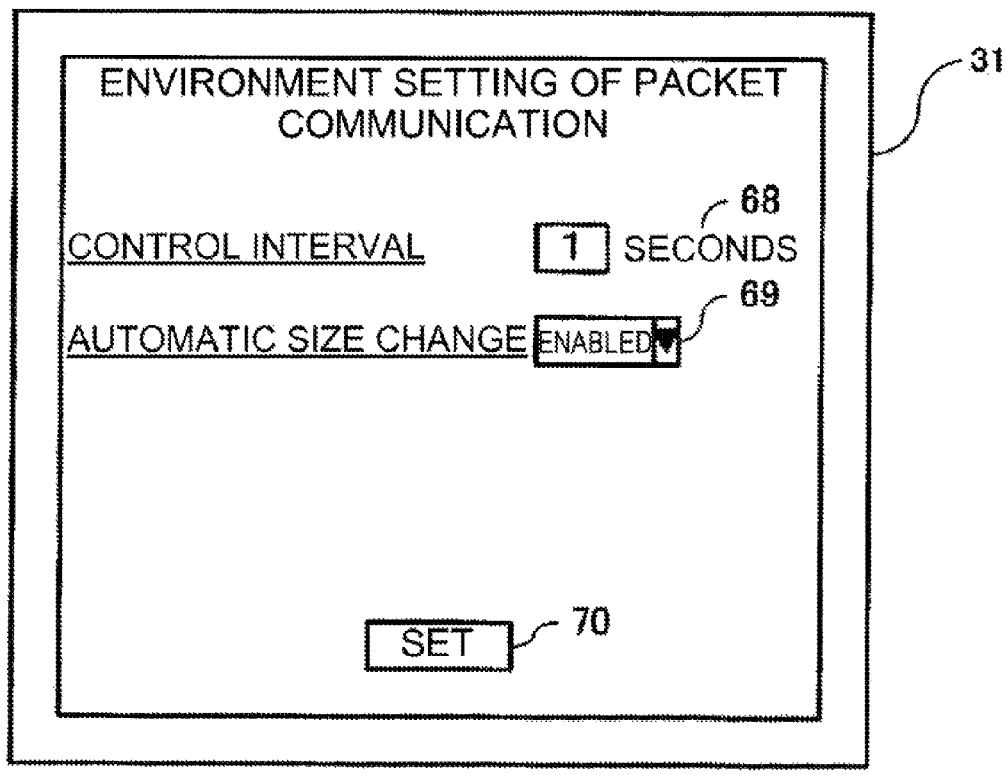
FIG. 5 illustrates an example of a screen for setting a packet communication environment.

Now, by referring back to FIG. 1, the environment setting unit 37 sets the packet communication environment for the mobile phone terminal 10. FIG. 5 illustrates an example of a screen for setting a packet communication environment. The screen illustrated in FIG. 5 includes an area 68 for inputting a control interval of the packet communication, a list box 69 for selecting whether automatic size change is enabled or not, and a set button 70 for changing the setting.

Here, the control interval refers to an interval for controlling the packet communication so as to keep the packet frequency below the packet frequency upper limit in the contract level when the contract type is the aforementioned type 2 or 3. In other word, the control interval is a unit period (hereinafter referred to as a "control unit period") obtained by further dividing a unit period (hereinafter referred to as a "calculation unit period") used to calculate the packet frequency for determining the packet communication fee. For example, the calculation unit period may be set to one hour and the control unit period may be set to one second.

Further, the automatic size change list box 69 is used to select whether automatic change is "enabled" or "disabled" for the size of data to be transmitted or received when the packet frequency is likely to exceed the contract level. In response to the user operation, the environment setting unit 37 generates setting information indicating the control interval, the automatic size change, and like and stores the information in the set information storage unit 38.

The packet frequency calculation unit 39 (packet communication volume calculation unit) calculates a packet frequency in each control interval (control unit period) stored in the environment setting unit 37 based on the expression (1) and stores the calculated packet frequency in the packet frequency storage unit 40. Further, the packet frequency calculation unit 39 calculates a packet frequency in each calculation unit period based on the packet frequency in each control unit period stored in the packet frequency storage unit 40 and stores the calculated packet frequency in the packet frequency storage unit 40.

The packet communication control unit 41 controls the packet communication unit 32 based on the packet frequency in each control unit period so as to keep the packet frequency in each calculation unit period below the packet frequency upper limit in the contract level when the contract type is type 2 or type 3. Note that the packet communication control method by the packet communication control unit 41 includes stopping the packet communication and changing the data size.

Here, the description focuses on an example assuming that the calculation unit period is one hour; the control unit period is one second; the priority weight of all the packets is 1; and the upper limit of the packet communication volume in the current time period (one hour) in the contract level is 10 MB (10,485,760 bytes). In this case, the user is allowed an average packet communication volume of 2,912 bytes per second (control unit period), namely, a packet frequency of 2,912 B/s. When the packet frequency per second calculated by the packet frequency calculation unit 39 exceeds 2,912 bytes/s, the packet communication control unit 41 stops the packet communication until the average packet frequency per second is 2,912 bytes/s. For example, when the most recent packet frequency per second is 5,824 bytes/s, the packet communication control unit 41 stops the packet communication in the next second. Thus, an average packet frequency for the two seconds including the most recent second and next second is 2,912 bytes/s. Such control of the packet communication results in a control so as to keep the packet frequency in each calculation unit period below the packet frequency upper limit in the contract level.

Figure 6:
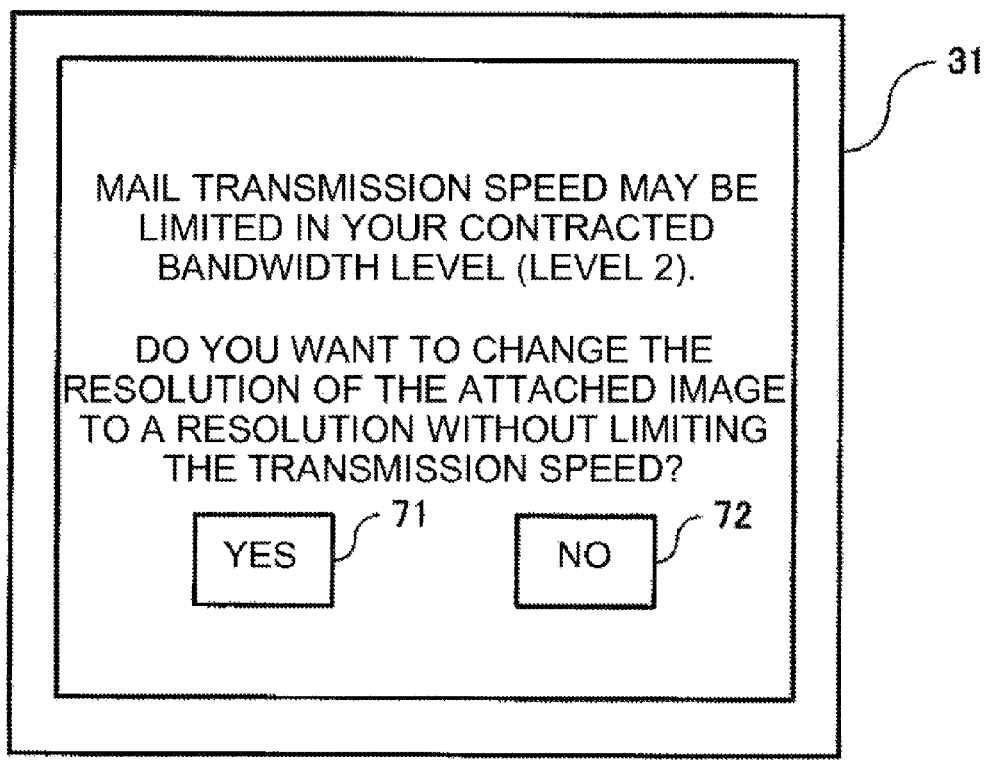
FIG. 6 illustrates an example of a screen for changing a resolution of a still image.

Alternatively, the packet communication control unit 41 may change the size of data to be transmitted or received so as to keep the packet frequency in each calculation unit period below that in the contract level. Such a change in data size can avoid the packet communication from being stopped. For example, the packet communication control unit 41 may display a screen for changing the resolution of an image file attached to a mail message as illustrated in FIG. 6. This screen includes buttons 71 and 72 for selecting whether the image resolution is changed or not, so as not to allow the packet communication to be stopped. Here, when the "Yes" button 71 is pressed, the packet communication control unit 41 changes the image resolution so as to keep the packet frequency in each control unit period below the packet frequency upper limit in the contract level.

Figure 7:
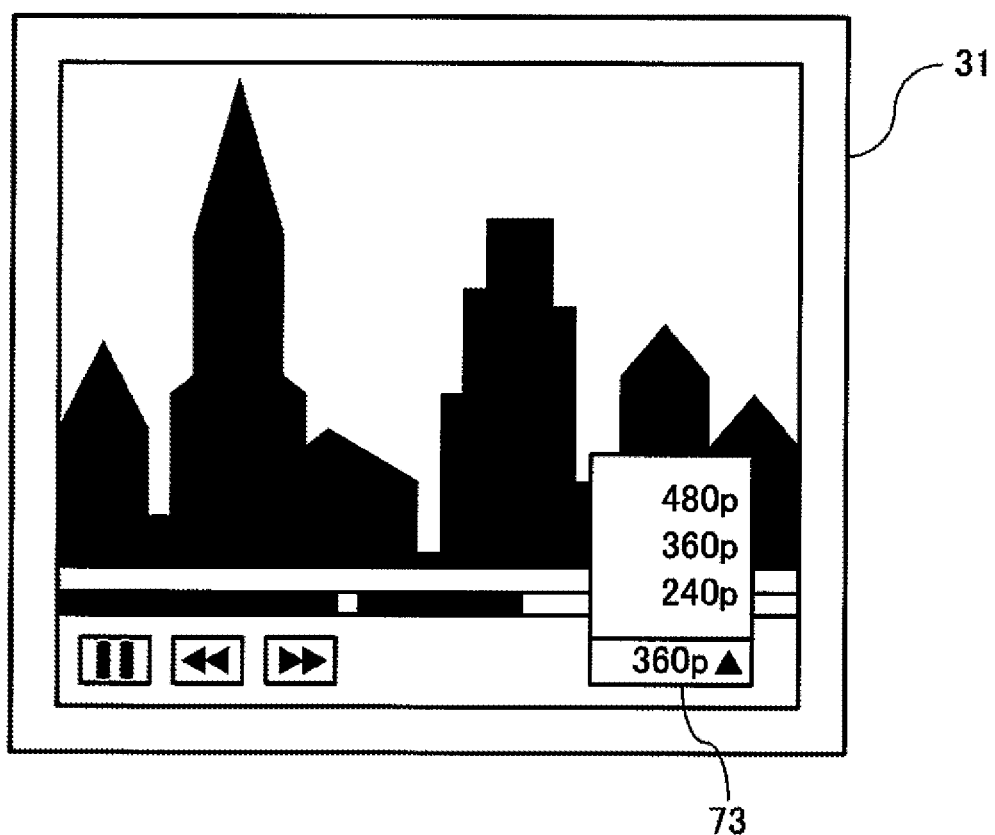
FIG. 7 illustrates an example of a screen displaying a moving image.
Figure 8:
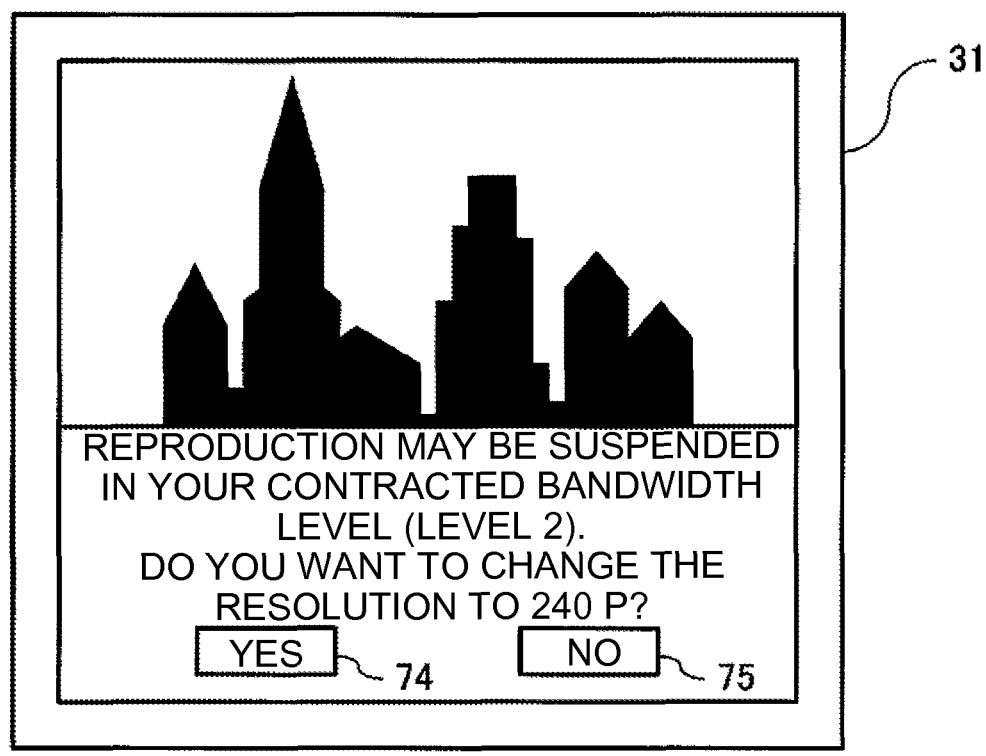
FIG. 8 illustrates an example of a screen for changing a resolution of the moving image.

For example, as illustrated in FIG. 7, when a moving image is received by streaming, the packet communication control unit 41 may display a selection list 73 for selecting the resolution to perform similar control. More specifically, when the selected resolution may cause the packet frequency in each control unit period to exceed the packet frequency upper limit in the contract level, the packet communication control unit 41 may display a screen for changing the resolution of the image as illustrated in FIG. 8. This screen includes buttons 74 and 75 for selecting whether the resolution is changed or not. Here, when the "Yes" button 74 is pressed, the packet communication control unit 41 changes the resolution of the moving image data to be streamed. For example, the packet communication control unit 41 changes the resolution set by a streaming request from 360 p to 240 p. Thereby, the resolution is reduced, but the continuous reproduction is enabled.

Now, by referring back to FIG. 1, the information output unit 42 can display information about the packet frequency in the mobile phone terminal 10 and information about the relation between the communication time period and the packet frequency in each bandwidth level to the display unit 31.

Figure 9:
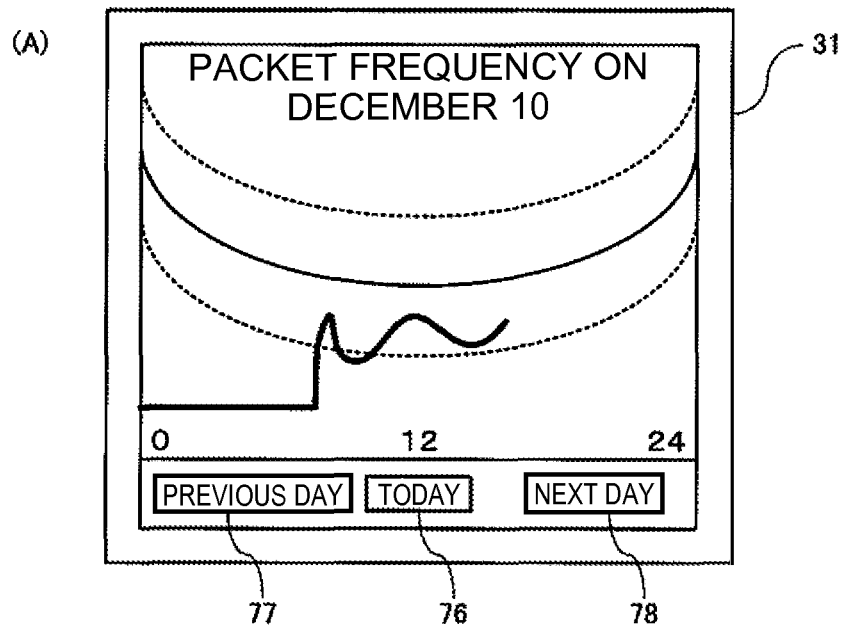
FIG. 9 illustrates an example of a screen displaying a packet frequency performance.
Figure 9:
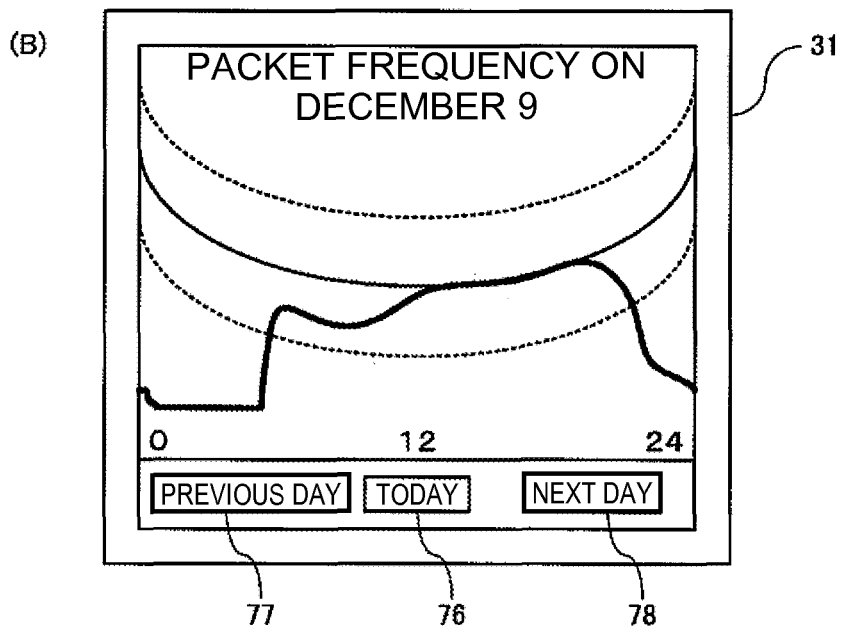

For example, as illustrated in FIG. 9, the information output unit 42 may display a screen displaying the packet frequency in each calculation unit period stored in the packet frequency storage unit 40. The screen illustrated in FIG. 9(A) displays information about today (December 10). On the screen, a bold solid line indicates the packet frequency performance. Further, the screen displays three bandwidth levels. The solid line indicates the contract level; and the dotted line indicates the bandwidth level before or after the contract level. Furthermore, the screen displays buttons 76 to 78 for changing the target date. For example, on the screen of FIG. 9(A), when the "previous day" button 77 is pressed, information about the previous day (December 9) is displayed as illustrated in FIG. 9(B). Note that on the screen of FIG. 9(B), the packet frequency is located along the packet frequency upper limit in the contract level for several hours from about 12 o'clock. This means that there is a high possibility that the packet communication control unit 41 controlled the packet communication so as to keep the packet frequency below the packet frequency upper limit in the contract level. Note that the information output unit 42 may be configured to explicitly output the information indicating that the packet communication control unit 41 performed a packet communication control.

Figure 10:
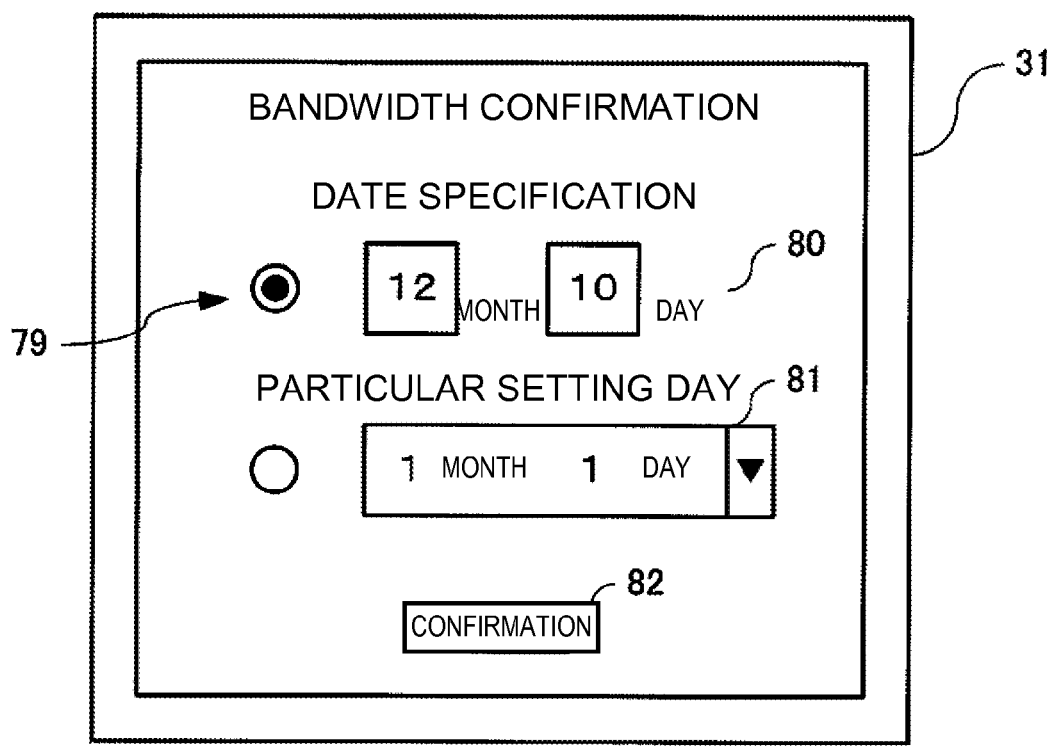
FIG. 10 illustrates an example of a user interface for confirming a bandwidth level.
Figure 11:
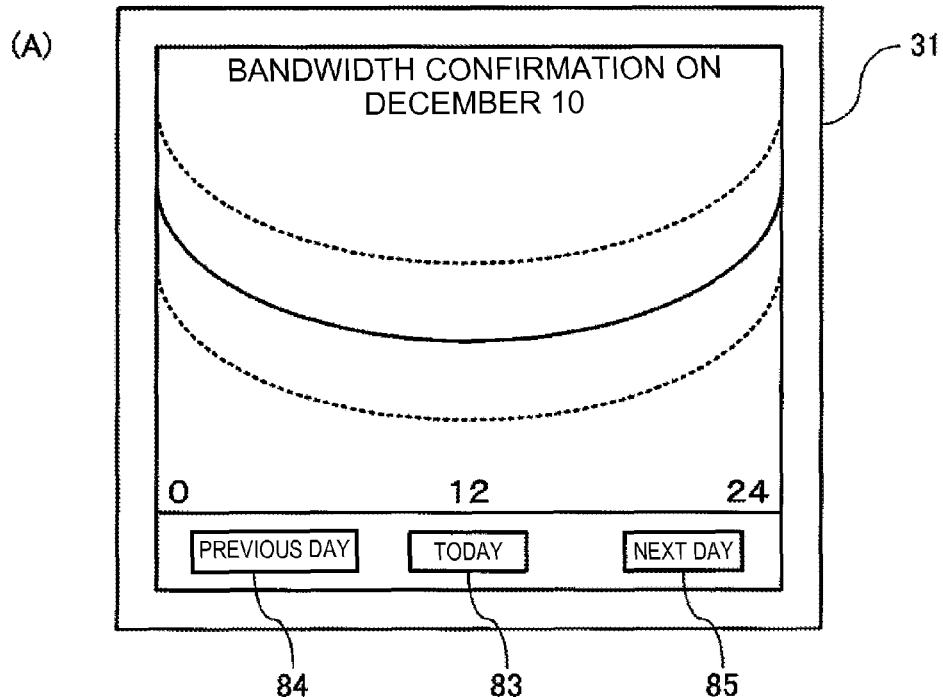
FIG. 11 illustrates an example of a screen displaying a bandwidth level.
Figure 11:
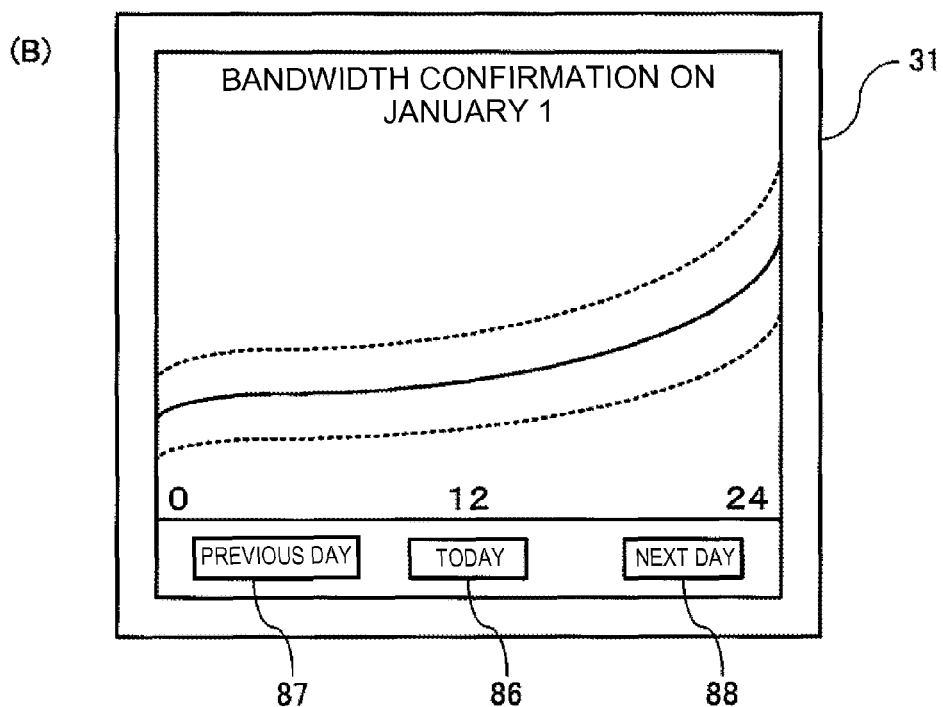

For example, as illustrated in FIGS. 10 and 11, the information output unit 42 may display a screen displaying information about a bandwidth level stored in the bandwidth level storage unit 33. The screen illustrated in FIG. 10 includes: radio buttons 79 for selecting a method of specifying the target date; an area 80 for inputting the date; a list box 81 for selecting the date; and a button 82 for instructing the information about the specified date to be displayed. For example, when a date (December 10) is inputted in the area 80 and the confirmation button 82 is pressed, the information output unit 42 displays the information indicating the bandwidth level on December 10 as illustrated in FIG. 11(A). Note that the solid line indicates the contract level; and the dotted line indicates the bandwidth level before or after the contract level. Further, this screen displays buttons 83 to 85 for changing the target date. For example, when the date (January 1) is selected in the area 81 and the confirmation button 82 is pressed, the information output unit 42 displays the information indicating the bandwidth level on January 1 as illustrated in FIG. 11(B). Note that the list box 81 includes a date different from an ordinary day in the bandwidth level (particular setting day). For example, around 0 O'clock on January 1, contrary to an ordinary day, the number of mail messages to be transmitted or received for new year's greetings tends to increase. Therefore, as illustrated in FIG. 11(B), the packet frequency upper limit in each bandwidth level may be reduced in a time period around 0 O'clock on January 1.

Now, by referring back to FIG. 1, the base station 12 is a communication apparatus of the common carrier, and a plurality of base stations 12 is located in a service area of the common carrier. Note that generally the mobile phone terminal 10 communicates with a base station 12 having the strongest signal strength at its current position, of the plurality of base stations 12.

The gateway 14 controls communication between a network in the common carrier and the Internet 16 that is an external network. For example, when an access request to a Web site on the Internet is issued from the mobile phone terminal 10, the access request is transmitted from the base station 12 to the Internet 16 side through the gateway 14. When a response to the access request is returned from the Internet 16 side, the response is transmitted from the gateway 14 to the mobile phone terminal 10 through the base station 12.

The server 18 is an information processing apparatus provided on the common carrier side for setting the bandwidth level, determining the charge, and like. As illustrated in FIG.

1, the server 18 includes a bandwidth level setting unit 50, a bandwidth level storage unit 51, a bandwidth level transmitting unit 52, a contract level setting unit 53, a contract level storage unit 54, a communication performance storage unit 55, a packet frequency calculation unit 56, a packet frequency storage unit 57, a charge determination unit 58, and a charge storage unit 59.

The bandwidth level setting unit 50 sets information about a bandwidth level of each contract type, and stores the information in the bandwidth level storage unit 51 (threshold storage unit). Here, the information about a bandwidth level refers to the information indicating the relation between the communication time period and the packet frequency upper limit (threshold) in each bandwidth level illustrated in FIG. 2. Note that the charge may differ depending on the contract type even in the same bandwidth level. In addition, the relation between the communication time period and the packet frequency may differ depending on the day in a contract type.

The bandwidth level transmitting unit 52 can transmits the information about a bandwidth level stored in the bandwidth level storage unit 51 to the mobile phone terminal 10. For example, when information about a bandwidth level on a particular setting day is newly set, the bandwidth level transmitting unit 52 can transmit the information to the mobile phone terminal 10. Note that the bandwidth level transmitting unit 52 may be configured not to transmit all the information about a bandwidth level stored in the bandwidth level storage unit 51 to all the mobile phone terminals 10, but to transmit only the information required for each mobile phone terminal 10. For example, the bandwidth level transmitting unit 52 may transmit only the information about the bandwidth level corresponding to the contract type to each mobile phone terminal 10.

In response to a request from the contract level setting unit 36 of the mobile phone terminal 10, the contract level setting unit 53 sets the contract type and the contract level of the mobile phone terminal 10 and stores them in the contract level storage unit 54.

The communication performance storage unit 55 stores information indicating a packet communication performance in each mobile phone terminal 10. The information indicating a packet communication performance includes information indicating the communication time, the communication volume, and the communication destination.

The packet frequency calculation unit 56 (packet communication volume calculation unit) uses the information stored in the communication performance storage unit 55 to calculate the packet frequency in each calculation unit period (e.g., one hour) in a charge unit period (e.g., one month) for each mobile phone terminal 10 based on the expression (1) and stores the calculated packet frequency in the packet frequency storage unit 57. Note that the packet frequency calculation unit 56 may be configured to calculate the packet frequency on only the mobile phone terminal 10 required to calculate the packet frequency for determining the charge. For example, the packet frequency may not be calculated on a mobile phone terminal 10 in which the contract type is type 2 and its monthly packet communication fee is fixed.

The charge determination unit 58 uses the information stored in the bandwidth level storage unit 51, the contract level storage unit 54, and the packet frequency storage unit 57 to determine the charge in the charge unit period for each mobile phone terminal 10. Note that the determined charge is associated with the identifier of the mobile phone terminal 10 and stored in the charge storage unit 59.

Hereinafter, the description will focus on the packet communication control process in the mobile phone terminal 10 and the charge determination process in the server 18.

Figure 12:
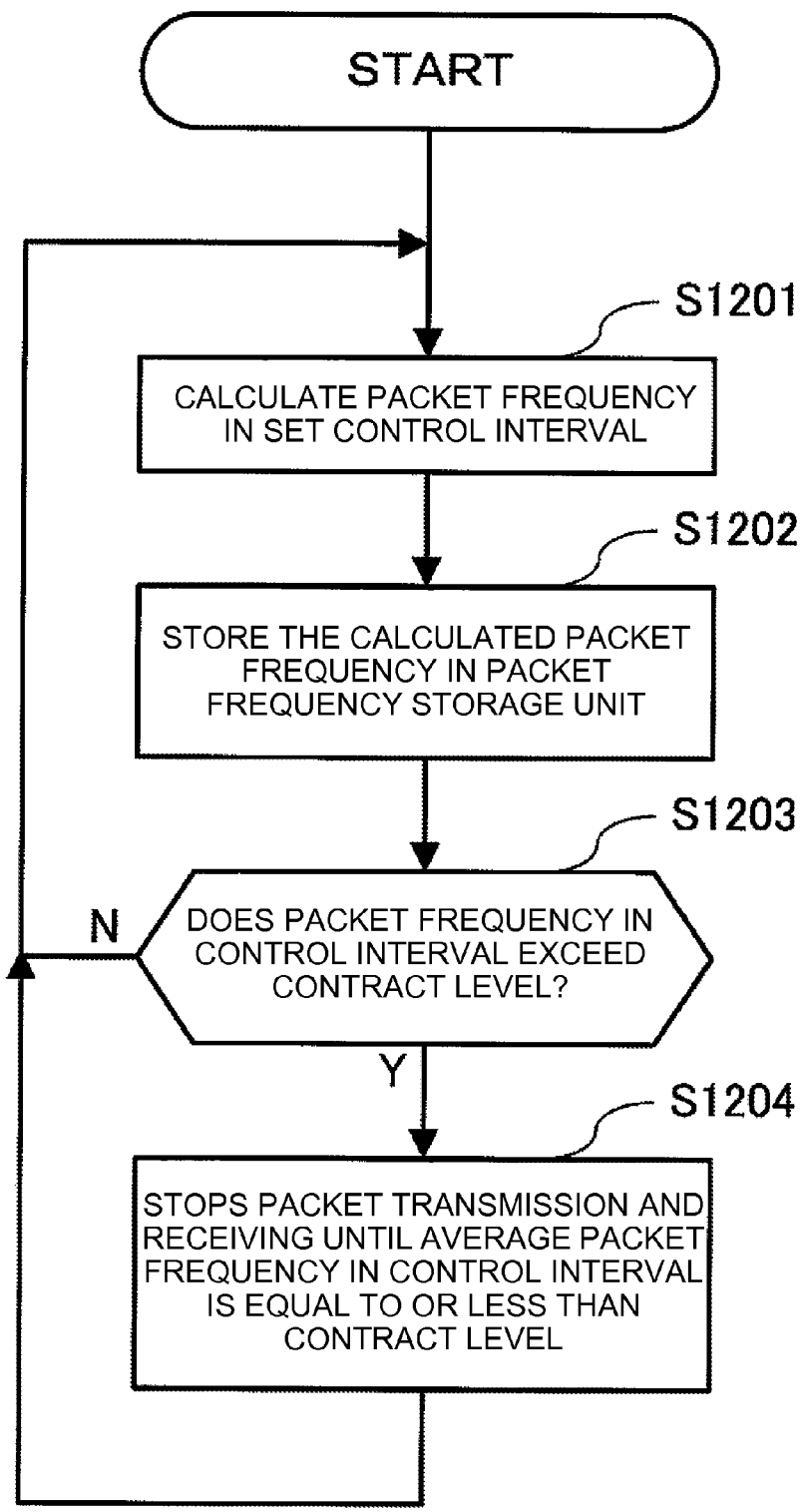
FIG. 12 includes a flowchart illustrating an example of a packet communication control process in a mobile phone terminal.

FIG. 12 is a flowchart illustrating an example of a packet communication control process in the mobile phone terminal 10. Note that this process may be activated in the case of contract types (type 2 and type 3) in which the packet frequency upper limit is set and when the mobile phone terminal 10 it turned on.

The packet frequency calculation unit 39 uses the control interval stored in the set information storage unit 38 to calculate the packet frequency in the most recent control interval (e.g., one second) based on the expression (1) (S1201) and to store the calculated packet frequency in the packet frequency storage unit 40 (S1202). Then, the packet communication control unit 41 confirms whether the packet frequency in the most recent control interval exceeds the packet frequency upper limit in the current time period in the contract level or not (S1203). If the packet frequency does not exceed the packet frequency upper limit (S1203: N), the packet communication control unit 41 does not limit the packet communication conducted by the packet communication unit 32. If the packet frequency exceeds the packet frequency upper limit (S1203: Y), the packet communication control unit 41 stops the packet communication conducted by the packet communication unit 32 until the average packet frequency in the control interval is equal to or less than the packet frequency upper limit in the contract level (S1204). For example, if the control interval is one second and the packet frequency in the most recent control interval is three times the packet frequency upper limit in the current time period in the contract level, the packet communication control unit 41 stops the packet communication conducted by the packet communication unit 32 for the next two seconds. Thereby, the average packet frequency for the three seconds including the most recent one second and the next two seconds is equal to or less than the packet frequency upper limit in the contract level.

Figure 13:
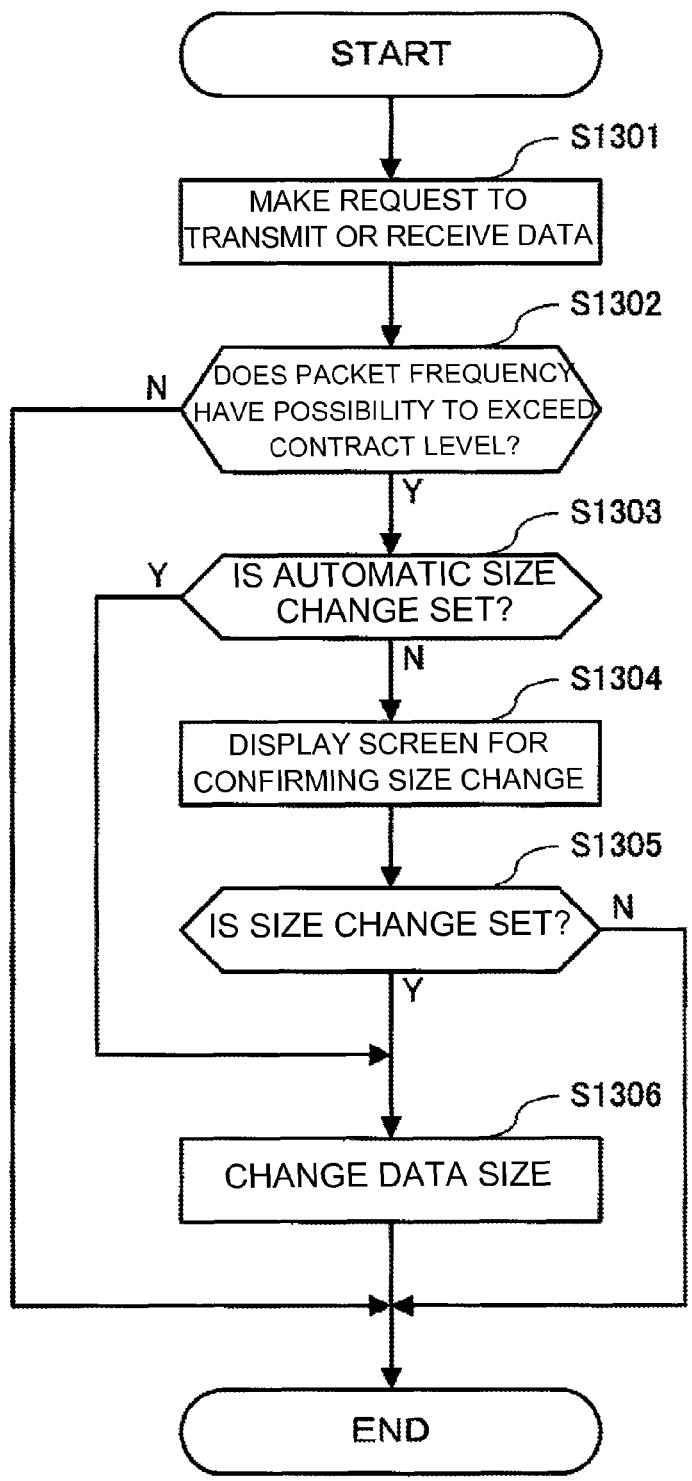
FIG. 13 includes a flowchart illustrating an example of a change process of a size of data transmitted or received in the mobile phone terminal.

FIG. 13 is a flowchart illustrating an example of a change process of a size of data transmitted or received in the mobile phone terminal 10. Note that this process is activated when the mobile phone terminal 10 makes a request to transmit or receive size-changeable data such as a still image and a moving image.

First, the mobile phone terminal 10 makes a request to transmit or receive data (S1301). Here, the process of transmitting or receiving data refers to transmitting a mail message with an image file attached, streaming a moving image, and like. The packet communication control unit 41 uses the size of the data to be transmitted or received to determine whether the packet frequency in each control interval (e.g., one second) has a possibility to exceed the packet frequency upper limit in the contract level or not (S1302). If there is no possibility (S1302: N), the data size is not changed and the data is transmitted or received as requested.

If there is a possibility (S1302: Y), the packet communication control unit 41 confirms the setting information about automatic size change stored in the environment setting unit 37 (S1303). If the automatic size change is not set (S1303: N), the packet communication control unit 41 displays a screen for confirming the data size change (S1304) as illustrated in FIGS. 6 and 8.

If the no-data-size-change is selected (S1305: N), the data size change is not performed and the data with the original data size is transmitted or received. Note that in this case, the process illustrated in FIG. 12 is performed and the packet transmission or receiving is expected to temporarily stop so as to allow the average packet frequency in each control interval is equal to or less than the contract level.

If the data-size-change is selected (S1305: Y), the packet communication control unit 41 changes the data size so as to keep the packet frequency in each control interval below the packet frequency upper limit in the contract level (S1306). Note that even if the automatic size change is set (S1303: Y), the packet communication control unit 41 changes the data size in the same manner (S1306).

Figure 14:
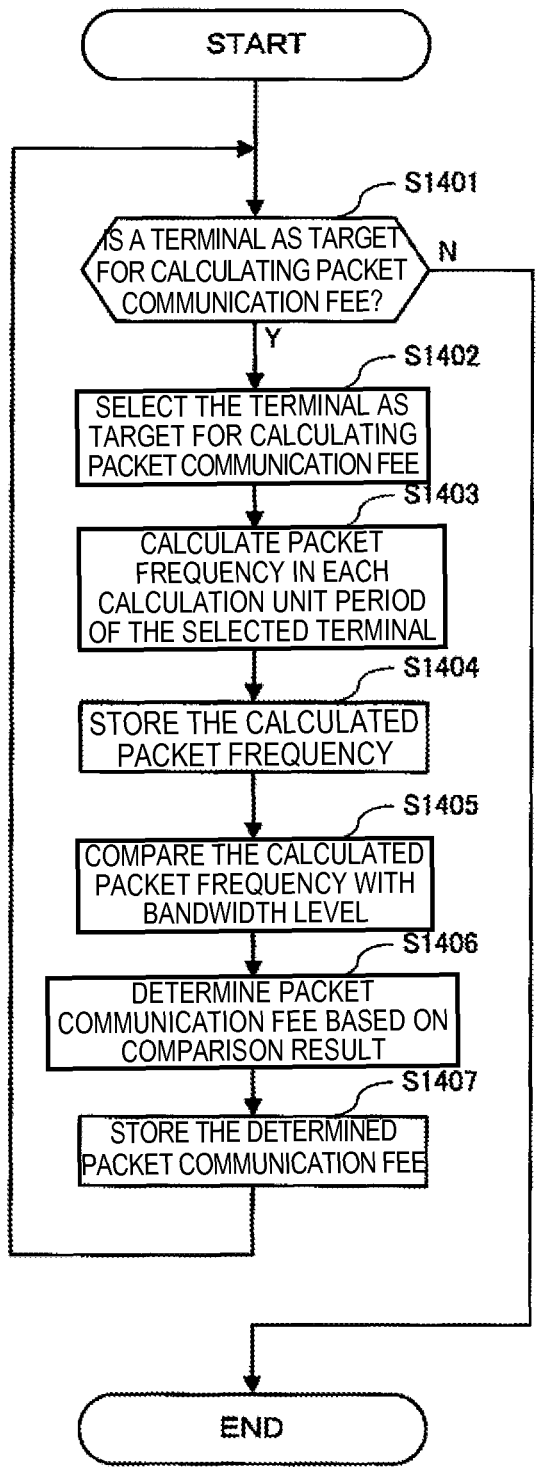
FIG. 14 includes a flowchart illustrating an example of a charge determination process in a server.

FIG. 14 is a flowchart illustrating an example of the charge determination process in the server 18. Note that this process is periodically performed such as a process of determining the charge in each charge unit period (e.g., one month).

First, the packet frequency calculation unit 56 confirms whether there is a mobile phone terminal 10 as a target for calculating the packet communication fee or not (S1401). More specifically, a confirmation is made that there is a mobile phone terminal 10 whose contract type is that the packet communication fee is changed according to the packet frequency and whose calculation of the packet communication fee is not completed. If there is no mobile phone terminal 10 (S1401: N), the process ends.

If there is a mobile phone terminal 10 to be calculated (S1401: Y), the packet frequency calculation unit 56 selects the mobile phone terminal 10 to be calculated (S1402). Then, the packet frequency calculation unit 56 calculates the packet frequency in each calculation unit period (e.g., one hour) of the selected mobile phone terminal 10 based on the information stored in the communication performance storage unit 55 (S1403) and stores the calculated packet frequency in the packet frequency storage unit 57 (S1404).

The charge determination unit 58 compares the packet frequency in each calculation unit period stored in the packet frequency storage unit 57 with the packet frequency upper limit in the bandwidth level corresponding to the contract type stored in the bandwidth level storage unit 51 (S1405). Then, the charge determination unit 58 determines the packet communication fee based on the comparison result (S1406) and stores the determined packet communication fee in the charge storage unit 59. More specifically, when the contract type is type 1 or type 3, the charge determination unit 58 determines which bandwidth level the packet frequency performance corresponds to, determines the fee set to the determined bandwidth level as the packet communication fee, and stores the determined fee in the charge storage unit 59. Note that when a packet frequency performance value in a mobile phone terminal 10 exceeds the packet frequency upper limit in a bandwidth level a predetermined number of times, the charge determination unit 58 may determine the fee set to the bandwidth level as the packet communication fee.

The above processes (S1401 to 1407) are repeatedly executed while there is a mobile phone terminal 10 as a target for calculating the packet communication fee.

It should be noted that the present disclosure should not be limited to the aforementioned embodiments, but various modifications, additions, and omissions may be made without departing from the idea and the scope disclosed in the claims.

The present disclosure has focused on the mobile phone terminal 10 as an example of an information processing apparatus performing packet communication, but the information processing apparatus is not limited to the mobile phone terminal 10. For example, the information processing apparatus may be any terminal performing packet communication to and from a communication apparatus of the common carrier such as a personal digital assistant and a notebook PC. Note that the information processing apparatus such as a personal digital assistant and a notebook PC may use a data communication card to perform packet communication to and from a communication apparatus of the common carrier. In such a configuration, driver software for using the data communication card corresponds to the packet communication unit 32 of the present disclosure. Note also that the packet communication is not limited to wireless communication, but may be wired communication such as optical communication and ADSL.

REFERENCE SIGNS LIST

10 mobile phone terminal
12 base station
14 gateway
16 Internet
18 server
30 input unit
31 display unit
32 packet communication unit
33 bandwidth level storage unit
34 bandwidth level receiving unit
35 contract level storage unit
36 contract level setting unit
37 environment setting unit
38 set information storage unit
39 packet frequency calculation unit
40 packet frequency storage unit
41 packet communication control unit
42 information output unit
50 bandwidth level setting unit
51 bandwidth level storage unit
52 bandwidth level transmitting unit
53 contract level setting unit
54 contract level storage unit
55 communication performance storage unit
56 packet frequency calculation unit
57 packet frequency storage unit
58 charge determination unit
59 charge storage unit

The invention claimed is:

1. An information processing apparatus comprising:
a threshold storage unit configured to store a first threshold of a common carrier, the common carrier being capable of charging according to the first threshold to be applied to a packet communication volume in each first unit period, wherein:
the first threshold varies during a communication time period made up of multiple sequential first unit periods;
the communication time period is equal to a 24-hour day; and
the first threshold varies during the communication time period for at least some days such that it decreases from midnight to about noon and increases from about noon to midnight;
a packet communication unit configured to perform packet communication to and from a communication apparatus of the common carrier;
a packet communication volume calculation unit configured to continually calculate a packet communication volume throughout the first unit period, including calculation of the packet communication volume in each second unit period shorter than the first unit period, the packet communication volume in each second unit period including a sum of a plurality of weighted packets such that at least some of the weighted packets having a first weight contribute a different amount per packet to the packet communication volume than others of the weighted packets having a second different weight, and wherein a weight of each packet is independent of a size of each packet, wherein:
- a communication destination of a first packet of the weighted packets is a general communication destination and a weight of the first packet is a first value;
- a communication destination of a second packet of the weighted packets is an important communication destination and a weight of the second packet is a second value less than the first value;
- packet communication with the important communication destination does not contribute to the calculated packet communication volume by setting the second value to zero; and
- a communication destination of a third packet of the weighted packets is a common carrier-related communication destination and a weight of the third packet is a third value between the first value and the second value; and
- a packet communication control unit configured to continually control the packet communication unit throughout the first unit period based on the packet communication volume in each second unit period so as to keep the packet communication volume in the first unit period below the first threshold, wherein:
    - packet communication can occur at least intermittently throughout a duration of the first unit period; and
    - each of the threshold storage unit, the packet communication unit, the packet communication volume calculation unit and the packet communication control unit is implemented at least partially by hardware.

2. The information processing apparatus according to claim 1, wherein the first unit period is in association with a communication time period.

3. The information processing apparatus according to claim 2, wherein the packet communication control unit is configured to stop packet communication conducted by the packet communication unit until an average packet communication volume in the second unit period is equal to or less than a second threshold so as to keep the packet communication volume in the first unit period below the first threshold when the packet communication volume in the second unit period exceeds the second threshold obtained by dividing the first threshold corresponding to the communication time period including a current time for each second unit period.

4. The information processing apparatus according to claim 3, further comprising a charge determination unit that is configured to determine a charge in a charge unit period based on a relation between a packet communication volume in a calculation unit time and a threshold corresponding to a communication time period including the calculation unit time for each calculation unit time.

5. The information processing apparatus according to claim 1, wherein the packet communication control unit is configured to enable or disable the packet communication conducted by the packet communication unit based on the packet communication volume in the second unit period so as to keep the packet communication volume in the first unit period below the first threshold.

6. The information processing apparatus according to claim 5, wherein when the packet communication volume in the second unit period exceeds a second threshold obtained by dividing the first threshold in the first unit period for each second unit period, the packet communication control unit is configured to stop the packet communication conducted by the packet communication unit until an average packet communication volume in the second unit period is equal to or less than the second threshold.

7. The information processing apparatus according to claim 1, wherein
the packet communication control unit is configured to change a size of data transmitted or received by the packet communication unit so as to keep the packet communication volume in the first unit period below the first threshold.

8. The information processing apparatus according to claim 7, further comprising
an information output unit configured to output information indicating that the size of the data is changed.

9. The information processing apparatus according to claim 1, wherein
the packet communication volume calculation unit is configured to calculate the packet communication volume in the second unit period using a weight determined according to an attribute of a packet.

10. The information processing apparatus according to claim 9, wherein
the attribute of the packet includes a communication destination in communication with the packet communication unit through a communication apparatus of the common carrier.

11. The information processing apparatus according to claim 1, wherein
the threshold storage unit is configured to store a communication time period and the first threshold associated with each other; and
the packet communication control unit is configured to control the packet communication unit based on the packet communication volume in the second unit period so as to keep the packet communication volume in the first unit period below the first threshold corresponding to the communication time period including a current time.

12. The information processing apparatus according to claim 11, further comprising
an information output unit configured to output information indicating a relation between the communication time period and the first threshold based on the communication time period and the first threshold stored in the threshold storage unit.

13. The information processing apparatus according to claim 1, further comprising
an information output unit configured to output information indicating a packet communication volume in each second unit period calculated by the packet communication volume calculation unit.

14. An information processing apparatus comprising:
a threshold storage unit configured to store a threshold to be applied to a packet communication volume in each calculation unit period shorter than a charge unit period with respect to packet communication of a user terminal;
a packet communication volume calculation unit configured to continually calculate a packet communication volume of the user terminal throughout the charge unit period, including calculation of the packet communication volume in each calculation unit period, the packet communication volume in each calculation unit period including a sum of a plurality of weighted packets such that at least some of the weighted packets having a first weight contribute a different amount per packet to the packet communication volume than others of the weighted packets having a second different weight, and wherein a weight of each packet is independent of a size of each packet; wherein:
- a communication destination of a first packet of the weighted packets is a general communication destination and a weight of the first packet is a first value;
- a communication destination of a second packet of the weighted packets is an important communication destination and a weight of the second packet is a second value less than the first value;
- packet communication with the important communication destination does not contribute to the calculated packet communication volume by setting the second value to zero; and
- a communication destination of a third packet of the weighted packets is a common carrier-related communication destination and a weight of the third packet is a third value between the first value and the second value; and a charge determination unit configured to determine a charge in the charge unit period based on a relation between the packet communication volume and the threshold in each calculation unit period calculated, wherein:
- packet communication can occur at least intermittently throughout a duration of the charge unit period; and
- each of the threshold storage unit, the packet communication volume calculation unit and the charge determination unit is implemented at least partially by hardware.

15. The information processing apparatus according to claim 14, wherein
the charge determination unit is configured to determine the charge in the charge unit period as a fee according to the threshold when the packet communication volume in the calculation unit period exceeds the threshold a predetermined number of times.

16. The information processing apparatus according to claim 14, wherein:
- the threshold storage unit is configured to store a communication time period and the threshold associated with each other; and
- the charge determination unit is configured to determine the charge in the charge unit period based on a relation between the packet communication volume in the calculation unit period and the threshold corresponding to the communication time period including the calculation unit period for each calculation unit period.

17. A packet communication method comprising:
storing, by a mobile communication device, a first threshold of a common carrier, the common carrier being capable of charging according to the first threshold to be applied to a packet communication volume in each first unit period, wherein:
- the first threshold varies during a communication time period made up of multiple sequential first unit periods;
- the communication time period is equal to a 24-hour day; and
- the first threshold varies during the communication time period for at least some days such that it decreases from midnight to about noon and increases from about noon to midnight;

performing, by the mobile communication device, a packet communication to and from a communication apparatus of the common carrier;

continually calculating, by the mobile communication device, the packet communication volume throughout the first unit period, including calculation of the packet communication volume in each second unit period shorter than the first unit period, the packet communication volume in each second unit period including a sum of a plurality of weighted packets such that at least some of the weighted packets having a first weight contribute a different amount per packet to the packet communication volume than others of the weighted packets having a second different weight, and wherein a weight of each packet is independent of a size of each packet; wherein:
- a communication destination of a first packet of the weighted packets is a general communication destination and a weight of the first packet is a first value;
- a communication destination of a second packet of the weighted packets is an important communication destination and a weight of the second packet is a second value less than the first value;
- packet communication with the important communication destination does not contribute to the calculated packet communication volume by setting the second value to zero; and
- a communication destination of a third packet of the weighted packets is a common carrier-related communication destination and a weight of the third packet is a third value between the first value and the second value; and continually controlling, by the mobile communication device, the packet communication throughout the first unit period based on packet communication volume in each second unit period so as to keep the packet communication volume in the first unit period below the first threshold;

wherein packet communication can occur at least intermittently throughout a duration of the first unit period.

18. A computer program product having computer executable instructions for causing an information processing apparatus to perform operations comprising:
storing a first threshold of a common carrier, the common carrier being capable of charging according to the first threshold to be applied to a packet communication volume in each first unit period, wherein:
- the first threshold varies during a communication time period made up of multiple sequential first unit periods;
- the communication time period is equal to a 24-hour day; and
- the first threshold varies during the communication time period for at least some days such that it decreases from midnight to about noon and increases from about noon to midnight;

performing a packet communication to and from a communication apparatus of the common carrier;

continually calculating the packet communication volume throughout the first unit period, including calculation of the packet communication volume in each second unit period shorter than the first unit period, the packet communication volume in each second unit period including a sum of a plurality of weighted packets such that at least some of the weighted packets having a first weight contribute a different amount per packet to the packet communication volume than others of the weighted packets having a second different weight, and wherein a weight of each packet is independent of a size of each packet; wherein:

a communication destination of a first packet of the weighted packets is a general communication destination and a weight of the first packet is a first value;

a communication destination of a second packet of the weighted packets is an important communication destination and a weight of the second packet is a second value less than the first value;

packet communication with the important communication destination does not contribute to the calculated packet communication volume by setting the second value to zero; and a communication destination of a third packet of the weighted packets is a common carrier-related communication destination and a weight of the third packet is a third value between the first value and the second value; and continually controlling the packet communication throughout the first unit period based on packet communication volume in each second unit period so as to keep the packet communication volume in the first unit period below the first threshold;

wherein packet communication can occur at least intermittently throughout a duration of the first unit period.

19. A charging method comprising:

storing, by a mobile communication device, a threshold to be applied to a packet communication volume in each calculation unit period shorter than a charge unit period with respect to a packet communication of a user terminal;

continually calculating, by the mobile communication device, a packet communication volume of the user terminal throughout the charge unit period, including calculating the packet communication volume in each calculation unit period, the packet communication volume in each calculation unit period including a sum of a plurality of weighted packets such that at least some of the weighted packets having a first weight contribute a different amount per packet to the packet communication volume than others of the weighted packets having a second different weight, and wherein a weight of each packet is independent of a size of each packet; wherein:

a communication destination of a first packet of the weighted packets is a general communication destination and a weight of the first packet is a first value;

a communication destination of a second packet of the weighted packets is an important communication destination and a weight of the second packet is a second value less than the first value;

packet communication with the important communication destination does not contribute to the calculated packet communication volume by setting the second value to zero; and a communication destination of a third packet of the weighted packets is a common carrier-related communication destination and a weight of the third packet is a third value between the first value and the second value; and determining, by the mobile communication device, the charge in the charge unit period based on a relation between the packet communication volume and the threshold in each calculation unit period calculated;

wherein packet communication can occur at least intermittently throughout a duration of the charge unit period.

* * * * *

UNITED STATES PATENT AND TRADEMARK OFFICE
CERTIFICATE OF CORRECTION

PATENT NO. : 9,087,351 B2
APPLICATION NO. : 13/127301
DATED : July 21, 2015
INVENTOR(S) : Kurabayashi et al.

It is certified that error appears in the above-identified patent and that said Letters Patent is hereby corrected as shown below:

In the specification

Column 1, Lines 5-7, insert -- CROSS-REFERENCE TO RELATED APPLICATIONS
The present application is a U.S. national stage filing under 35 U.S.C. § 371 of International Application No. PCT/JP2010/067337, filed on October 4, 2010.

Column 11, Line 51, delete "(S1401 to 1407)" and insert -- (S1401 to S1407) --, therefor.

Signed and Sealed this
Twelfth Day of January, 2016

Michelle K. Lee
*Director of the United States Patent and Trademark Office*